US011387478B2

(12) United States Patent
Yoo et al.

(10) Patent No.: US 11,387,478 B2
(45) Date of Patent: Jul. 12, 2022

(54) ELASTOMERIC CELL FRAME FOR FUEL CELL

(71) Applicants: Hyundai Motor Company, Seoul (KR); KIA Motors Corporation, Seoul (KR)

(72) Inventors: Jin Hyeok Yoo, Cheonan-si (KR); Yoo Chang Yang, Gunpo-si (KR); Byeong-Heon Jeong, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 164 days.

(21) Appl. No.: 16/895,365

(22) Filed: Jun. 8, 2020

(65) Prior Publication Data

US 2021/0184239 A1 Jun. 17, 2021

(30) Foreign Application Priority Data

Dec. 13, 2019 (KR) .................. 10-2019-0167250

(51) Int. Cl.
| | |
|---|---|
| *H01M 8/0273* | (2016.01) |
| *H01M 8/1004* | (2016.01) |
| *H01M 8/1018* | (2016.01) |
| *H01M 8/249* | (2016.01) |
| *H01M 8/0247* | (2016.01) |
| *H01M 8/242* | (2016.01) |

(52) U.S. Cl.
CPC ....... *H01M 8/1004* (2013.01); *H01M 8/0247* (2013.01); *H01M 8/1018* (2013.01); *H01M 8/242* (2013.01); *H01M 8/249* (2013.01)

(58) Field of Classification Search
None
See application file for complete search history.

(56) References Cited

U.S. PATENT DOCUMENTS 6,852,440 B1 * 2/2005 Bonsel ................ H01M 8/1007
429/414

FOREIGN PATENT DOCUMENTS

| JP | 2004-327358 A | 11/2004 |
| JP | 2007-123197 A | 5/2007 |
| JP | 2009-266684 A | 11/2009 |
| KR | 2018-0032242 A | 3/2018 |

* cited by examiner

*Primary Examiner* — Alix E Eggerding
(74) *Attorney, Agent, or Firm* — McDonnell Boehnen Hulbert & Berghoff LLP

(57) ABSTRACT

An elastomeric cell frame for a fuel cell according to an embodiment of the present disclosure includes, as a cell frame constituting a unit cell of a fuel cell, an insert including a membrane electrode assembly having an anode formed on one surface of a polymer electrolyte membrane, and having a cathode formed on the other surface thereof, and a pair of gas diffusion layers disposed on both surfaces thereof; and an elastomeric frame disposed to surround the rim of the insert in the outer region of the insert, and formed with a discharge flow field provided in the form of a sheet bonded at the rim of the insert and the interface thereof while being thermally bonded and for discharging generated water generated in the insert along the longitudinal direction at the widthwise edge.

12 Claims, 5 Drawing Sheets

ELASTOMERIC CELL FRAME FOR FUEL CELL

CROSS REFERENCE TO RELATED APPLICATIONS

The present application claims priority of Korean Patent Application No. 10-2019-0167250 filed on Dec. 13, 2019, the entire contents of which is incorporated herein for all purposes by this reference.

BACKGROUND OF THE DISCLOSURE

Field of the Disclosure

The present disclosure relates to an elastomeric cell frame for a fuel cell, and more particularly, to an elastomeric cell frame for a fuel cell which smoothes the discharge of generated water.

Description of the Related Art

A fuel cell is a type of power generator for converting chemical energy contained in fuel into electrical energy by electrochemically reacting in a stack, and may not only supply driving power for industrial, home, and vehicle but also may be used for supplying the power of small electronics such as a portable device, and in recent years, its use region is gradually expanding to a high-efficiency clean energy source.

The unit cell of a typical fuel cell has a Membrane Electrode Assembly (MEA) located at the innermost side, and the membrane electrode assembly is composed of a polymer electrolyte membrane capable of transporting hydrogen protons, and a catalyst layer, that is, an anode and a cathode coated so that hydrogen and oxygen may react on both surfaces of an electrolyte membrane.

In addition, a Gas Diffusion Layer (GDL) is laminated on the outer portion of the membrane electrode assembly, that is, the outer portion where the anode and the cathode are located, and a separating plate on which a flow field is formed to supply the fuel and discharge water generated by reaction is located on the outer portion of the gas diffusion layer.

A fuel cell stack is configured by laminating a plurality of unit cells having the above configuration in series in order to generate a desired level of output from the fuel cell. The fuel cell stack has an end plate coupled to the outermost sides of the unit cells in order to support and fix the plurality of unit cells.

Meanwhile, a Membrane-Electrode-Gasket Assembly (MEGA) which integrates a membrane electrode assembly and a gasket has been conventionally produced and used for convenience in the airtightness maintenance and lamination process of the unit cell.

In addition, in recent years, an integrated frame which integrates an insert, which bonds a gas diffusion layer to a membrane electrode assembly, and a gasket, has also been proposed.

However, the conventional integrated frame has bonded a frame of a plastic material and the insert by using an adhesive agent. In addition, when producing a unit cell by using the conventional integrated frame, a separate adhesive member and a sealing member have been required for adhering the separating plate and the integrated frame. This process has caused the material cost and the production cost to rise.

Meanwhile, in the case of a fuel cell, there has been a problem in that generated water generated as a result of chemical reaction accumulates on the outer portion of the reaction region and thus the membrane electrode assembly (MEA) is corroded.

Corrosion of the membrane electrode assembly (MEA) greatly affects the durability of the fuel cell and is an essential factor to be prevented.

In general, in order to effectively discharge the generated water from the fuel cell, a groove structure for draining the water has been formed in many cases. However, there has been a problem in that in the method of discharging the generated water by forming the groove through which the generated water is discharged in the membrane electrode assembly (MEA) or the gas diffusion layer (GDL), or collecting the generated water on the metal separating plate, the generated water still remains on the reaction region.

In addition, there have been drawbacks in that producing the groove structures in thin layers such as the membrane electrode assembly (MEA) and the gas diffusion layer (GDL) is very difficult to implement practically, and the reaction region may be changed when the structure is produced on the metal separating plate through the forming.

The foregoing explained as the background is intended merely to aid in the understanding of the background of the present disclosure, and is not intended to mean that the present disclosure falls within the purview of the related art that is already known to those skilled in the art.

SUMMARY OF THE DISCLOSURE

An object of the present disclosure is to provide an elastomeric cell frame for a fuel cell which forms a discharge flow field for discharging generated water in an elastomeric frame to smooth discharge of the generated water.

An elastomeric cell frame for a fuel cell according to an embodiment of the present disclosure includes, as a cell frame constituting a unit cell of a fuel cell, an insert including a membrane electrode assembly having an anode formed on one surface of a polymer electrolyte membrane, and having a cathode formed on the other surface thereof, and a pair of gas diffusion layers disposed on both surfaces thereof; and an elastomeric frame disposed to surround the rim of the insert in the outer region of the insert, and formed with a discharge flow field provided in the form of a sheet bonded at the rim of the insert and the interface thereof while being thermally bonded and for discharging generated water generated in the insert along the longitudinal direction at the widthwise edge.

A central region of the elastomeric frame is formed with a through hole in which the rim of the insert is seated and disposed, one side in the longitudinal direction with respect to the through hole is formed with a plurality of first manifold through holes through which reaction gas and coolant inflow and outflow, and the other side in the longitudinal direction is formed with a plurality of second manifold through holes through which the reaction gas and the coolant inflow and outflow, both surfaces of the elastomeric frame are formed with a first diffusion part through which the reaction gas inflows and outflows while being diffused between the first manifold through hole and the through hole, and a second diffusion part through which the reaction gas inflows and outflows while being diffused between the through hole and the second manifold through hole, respectively, and the discharge flow field is formed to be distinguished from the through hole to directly communicate the first diffusion part with the second diffusion part.

The discharge flow field is formed at positions corresponding to each other on both surfaces of the elastomeric frame, respectively.

The discharge flow field is classified into an anode-side discharge flow field formed on one surface, on which an anode is disposed, of both surfaces of the elastomeric frame, and a cathode-side discharge flow field formed on the other surface, on which a cathode is disposed, of both surfaces of the elastomeric frame, and the anode-side discharge flow field and the cathode-side discharge flow field are structures different from each other.

The anode-side discharge flow field is classified into a main discharge flow field for directly communicating an anode-side first diffusion part and an anode-side second diffusion part formed on one surface, on which the anode is disposed, of both surfaces of the elastomeric frame and a branch discharge flow field spaced at a predetermined interval apart from the main discharge flow field along the longitudinal direction and branched to the through hole.

The main discharge flow field and the branch discharge flow field do not directly contact an anode-side gas diffusion layer, which contacts the anode, of the pair of gas diffusion layers.

The main discharge flow field is formed in the form of a diffuser in which the outlet-side end portion to which the reaction gas is discharged is gradually wider in width with respect to the flow direction of the reaction gas.

The main discharge flow field is formed in the form which is gradually deeper in depth toward an outlet side to which the reaction gas is discharged with respect to the flow direction of the reaction gas.

The cathode-side discharge flow field is formed to directly communicate a cathode-side first diffusion part and a cathode-side second diffusion part formed on the other surface, on which the cathode is disposed, of both surfaces of the elastomeric frame.

The cathode-side discharge flow field directly contacts a cathode-side gas diffusion layer, which contacts the cathode, of the pair of gas diffusion layers.

The cathode-side discharge flow field is formed in the form of a diffuser in which the outlet-side end portion to which the reaction gas is discharged is gradually wider in width with respect to the flow direction of the reaction gas.

The cathode-side discharge flow field is formed in the form which is gradually deeper in depth toward an outlet side to which the reaction gas is discharged with respect to the flow direction of the reaction gas.

An embodiment of the present disclosure has the following effects.

Firstly, it is possible to prevent the corrosion of the MEA by inducing the flow of the generated water generated in the reaction region to a region other than the reaction region.

Secondly, it is not necessary to form a structure for discharging the generated water on the elastomeric frame to form an additional structure for discharging the generated water in the metal separating plate separately.

Thirdly, the reaction region may be maintained as much as possible because no additional structural change of the metal separating plate is required.

Fourthly, since the discharge flow field for discharging the generated water in the elastomeric frame is formed, it is possible to easily implement the discharge flow field even with a simple structural change of the injection mold.

BRIEF DESCRIPTION OF THE DRAWINGS

The above and other objects, features and other advantages of the present disclosure will be more clearly understood from the following detailed description when taken in conjunction with the accompanying drawings, in which.

DETAILED DESCRIPTION OF THE DISCLOSURE

Figure 1:
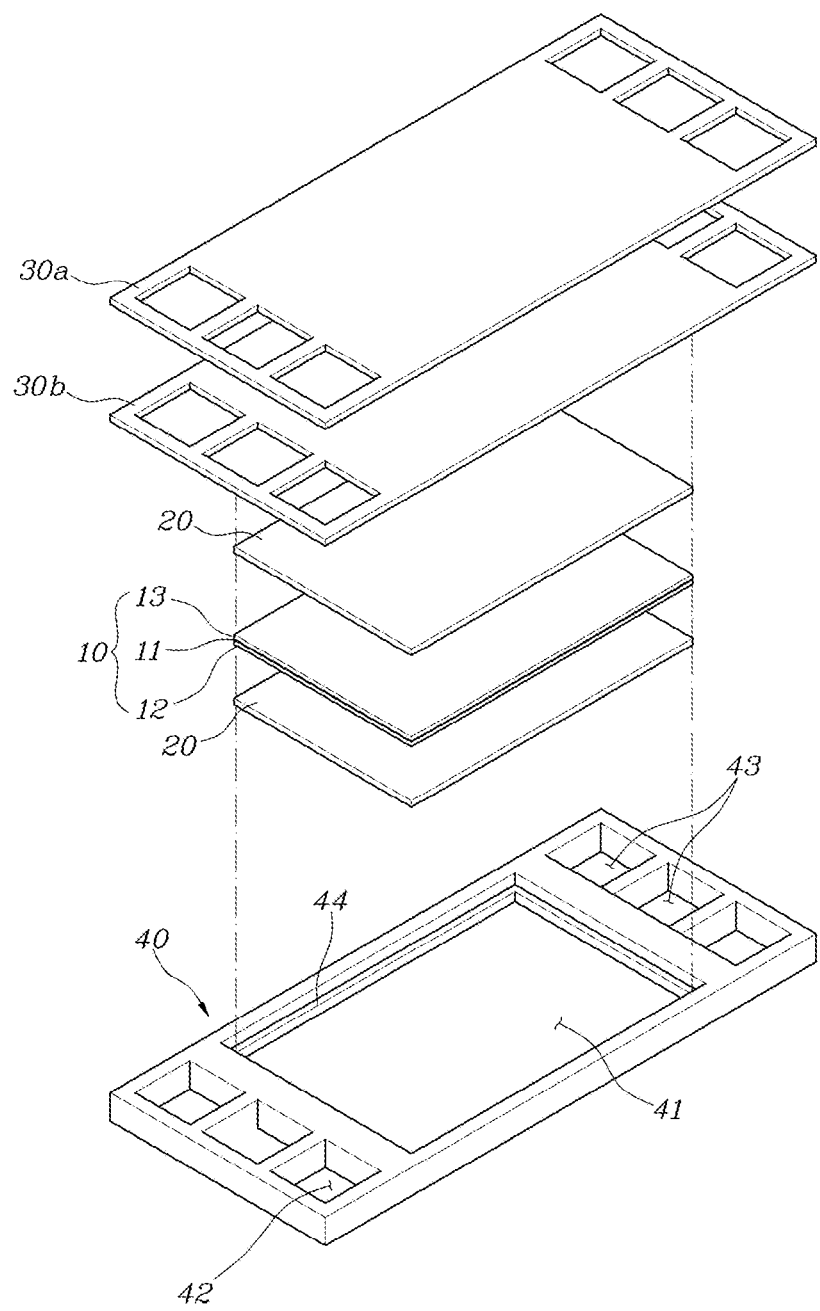
FIG. 1 is a diagram showing a configuration of an elastomeric cell frame.

Hereinafter, an embodiment of the present disclosure will be described in more detail with reference to the accompanying drawings. However, the present disclosure is not limited to an embodiment disclosed below but will be implemented in various different forms, and the present embodiments are only intended to complete the disclosure of the present disclosure, and are provided to completely inform those skilled in the art of the scope of the disclosure. In the drawings, the same reference numerals refer to the same elements.

First, a unit cell to which an elastomeric cell frame is applied will be described for explaining the present disclosure.

FIG. 1 is a diagram showing a configuration of an elastomeric cell frame.

As shown in FIG. 1, an elastomeric cell frame includes an insert in which a membrane electrode assembly 10 and a pair of gas diffusion layers 20 disposed on both surfaces thereof are bonded to each other, and an elastomeric frame 40 formed integrally on the outer region of the insert by the thermal bonding. In addition, a pair of separating plates 30a, 30b, in which a flow field is formed to supply reaction gas and discharge generated water generated by the reaction, are located on both surfaces of the elastomeric frame 40 formed integrally with the membrane electrode assembly 10 and the pair of gas diffusion layers 20.

The insert is an assembly of having laminated the membrane electrode assembly 10 and the pair of gas diffusion layers 20, and preferably, the gas diffusion layers 20 are disposed and laminated on one surface and the other surface of the membrane electrode assembly 10, respectively. At this time, the membrane electrode assembly 10 is composed of a polymer electrolyte membrane 11 capable of moving hydrogen protons, and a catalyst layer, that is, an anode 12 and a cathode 13, coated on both surfaces of the electrolyte membrane to allow hydrogen and oxygen to react.

The elastomeric frame 40 is a means which is integrally formed in the outer region of the insert for convenience in the airtightness maintenance and lamination process of the insert, and the elastomeric frame 40 is made of Thermo Plastic Elastomer (TPE) for bonding by the thermal bonding without separate adhesive agent while maintaining a predetermined shape.

At this time, the thermoplastic elastomer (TPE) may be formed of a resin-based hard segment and a rubber-based soft segment. Accordingly, the resin-based hard segment contributes to the thermal bonding of the elastomeric frame 40, and the rubber-based soft segment contributes to the elasticity and shape maintenance.

Accordingly, styrene-based, olefin-based, urethane-based, amide-based, polyester-based, or the like may be applied as the thermoplastic elastomer (TPE), and preferably, a polyolefin-based thermoplastic elastomer (TPE) may be applied. Then, the resin-based hard segment may be made of a polyolefin resin such as polyethylene (PE) or polypropylene (PP), and the rubber-based soft segment may be made of an olefin-based rubber such as Ethylene Propylene Diene Monomer Rubber (EPDM).

Meanwhile, the elastomeric frame 40 is disposed to surround any one surface and side surface of both surface of the rim of the insert in the outer region of the insert, and is formed integrally by being thermally bonded at the interface with the membrane electrode assembly 10 and the gas diffusion layer 20 exposed to any one surface and side surface of both surfaces of the rim of the insert. Here, the 'outer region' of the insert means a region including the edge region of the insert and the space in the vicinity thereof, and the 'rim' of the insert means the edge region of the insert.

The elastomeric frame 40 is disposed to surround the outer region of the insert while facing one surface and side surface of the rim of the insert. In particular, the elastomeric frame 40 may extend the interface with the insert for the airtight adhesion with the insert.

For example, an insert through hole 41 in which the insert is disposed is formed in the elastomeric frame 40, and a step part 44 surrounding one surface and side surface of the insert is formed in the inner circumferential surface of the insert through hole 41.

Accordingly, between the insert and the elastomeric frame 40, a bonding part by the thermal bonding is formed at the interface thereof, respectively, to thus firmly bond and integrate with each other.

In addition, the elastomeric frame 40 is formed with an inlet manifold through hole 42 and an outlet manifold through hole 43 for forming the manifold for flowing and discharging reaction gas and coolant into and from the reaction region formed by the insert, that is, the membrane electrode assembly 10 and the gas diffusion layer 20.

Meanwhile, the separating plates 30a, 30b are generally produced in a structure in which a land serving as a metal support, and a channel (flow field) serving as a fluid flow path are formed repeatedly.

Hereinafter, an elastomeric cell frame according to an embodiment of the present disclosure will be described in more detail with reference to the accompanying drawings.

Figure 2A:
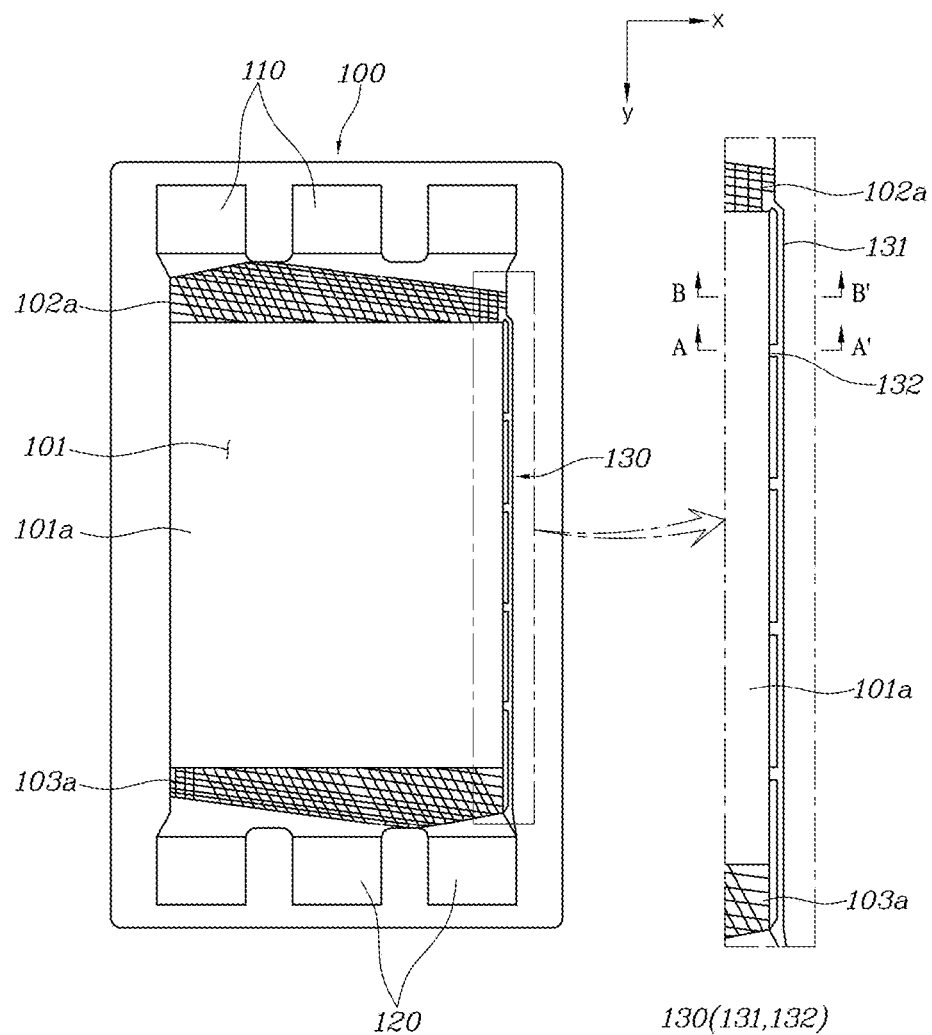
FIG. 2A is a diagram showing an anode-side surface of the elastomeric frame according to an embodiment of the present disclosure.
Figure 2B:
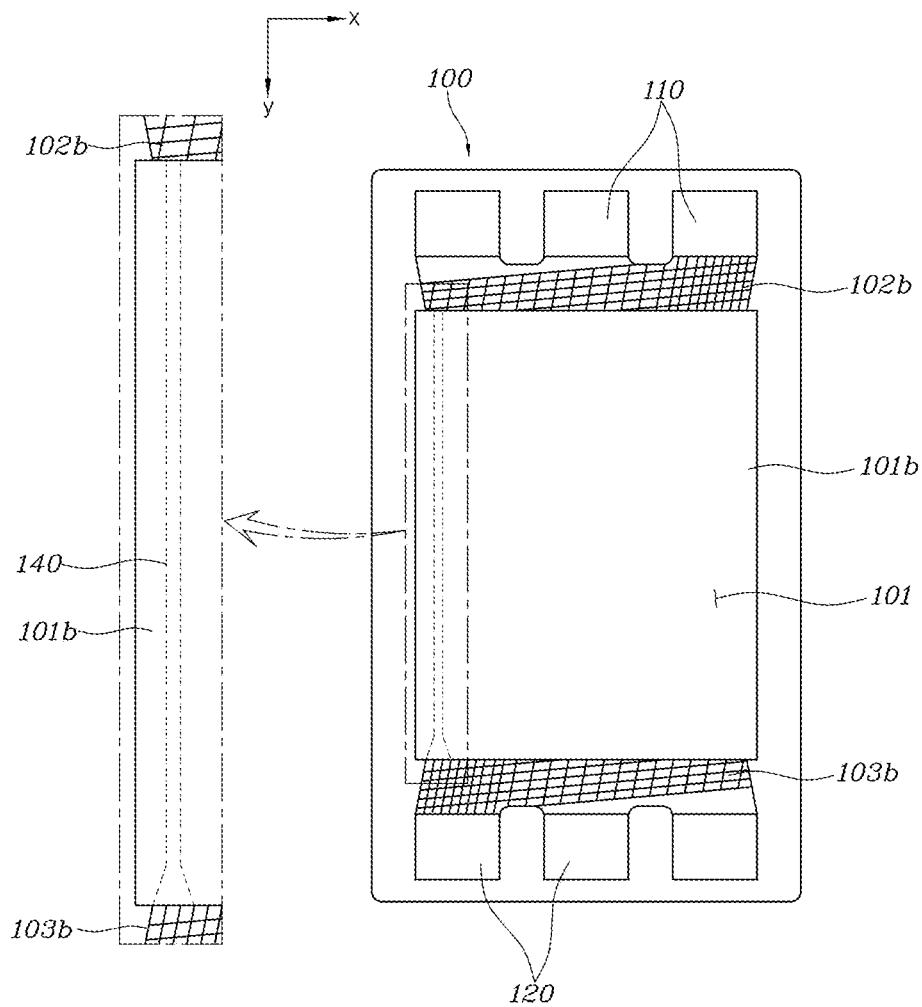
FIG. 2B is a diagram showing a cathode-side surface of the elastomeric frame according to an embodiment of the present disclosure.
Figure 3A:
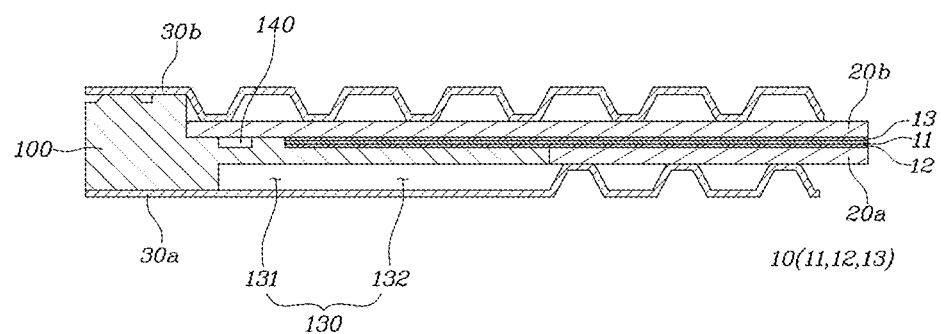
FIG. 3A is a diagram showing cross-sectional view taken along the line A-A' of FIG. 2A according to an embodiment of the present disclosure.
Figure 3B:
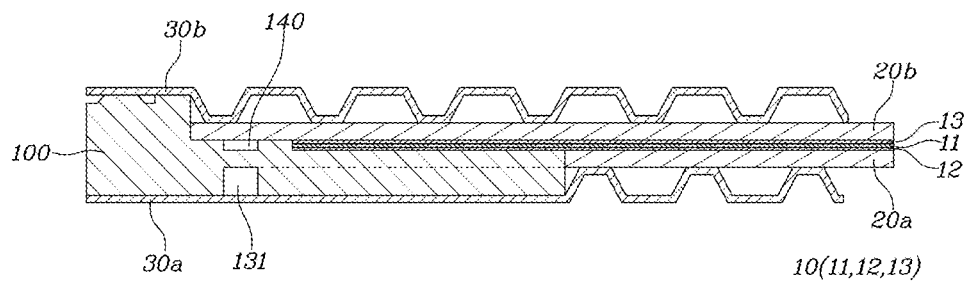
FIG. 3B is a diagram showing cross-sectional view taken along the line B-B' of FIG. 2A according to an embodiment of the present disclosure.

FIG. 2A is a diagram showing an anode-side surface of the elastomeric frame according to an embodiment of the present disclosure, FIG. 2B is a diagram showing a cathode-side surface of the elastomeric frame according to an embodiment of the present disclosure, and FIGS. 3A and 3B are diagrams showing cross-sectional diagrams of main portions of the elastomeric frame according to an embodiment of the present disclosure. At this time, FIG. 3A shows a cross section taken along the line A-A' of FIG. 2A, and FIG. 3B shows a cross section taken along the line B-B' of FIG. 2A.

As shown in the drawings, the elastomeric cell frame according to an embodiment of the present disclosure includes, as in the elastomeric frame 40 described with reference to FIG. 1, the membrane electrode assembly 10 having an anode 12 formed on one surface of the polymer electrolyte membrane 11, and having a cathode 13 formed on the other surface thereof; an insert having a pair of gas diffusion layers 20a, 20b disposed on both surfaces of the membrane electrode assembly 10 bonded; and an elastomeric frame 100 disposed to surround the rim of the insert in the outer region of the insert, and provided in the form of a sheet bonded at the rim of the insert and the interface thereof while being thermally bonded.

Since the insert has the same configuration as that of the insert constituting the elastomeric cell frame described with reference to FIG. 1, a redundant description will be omitted.

Likewise, since the configuration of the elastomeric frame 100 is also similar to that of the elastomeric frame 40 constituting the elastomeric cell frame described with reference to FIG. 1, a redundant description will be omitted.

The elastomeric frame 100 has an insert through hole 101 disposed while the rim of the insert is seated formed in the central region. In addition, a plurality of first manifold through holes 110 through which reaction gas and coolant inflow and outflow are formed at one side in the longitudinal direction with respect to the insert through hole 101, and a plurality of second manifold through holes 120 through which reaction gas and coolant inflow and outflow are formed at the other side in the longitudinal direction.

Here, the longitudinal direction of the elastomeric frame 100 means a direction in which reaction gas and coolant flow in the elastomeric frame, and the width direction of the elastomeric frame 100 to be described later means a direction perpendicular to the longitudinal direction of the elastomeric frame 100. In FIGS. 2A and 2B, the longitudinal direction means the "y" direction, and the width direction means the "x" direction.

In addition, both surfaces of the elastomeric frame 100 are formed with first diffusion parts 102a, 102b through which the reaction gas inflows and outflows while being diffused between the first manifold through hole 110 and the insert through hole 101, and second diffusion parts 103a, 103b through which the reaction gas inflows and outflows while being diffused between the insert through hole 101 and the second manifold through hole 120, respectively.

Meanwhile, discharge flow fields 130, 140 for discharging generated water generated in the insert along the longitudinal direction are formed at the widthwise edge of the elastomeric frame 100 according to the present disclosure.

At this time, the discharge flow fields 130, 140 are formed to be distinguished from the insert through hole 101 to directly communicate the first diffusion parts 102a, 102b with the second diffusion parts 103a, 103b. Accordingly, the discharge flow fields 130, 140 directly receives the pressure of the reaction gas flowing through the first diffusion parts 102a, 102b and the second diffusion parts 103a, 103b to smoothly flow the generated water on the discharge flow field.

Meanwhile, the elastomeric frame 100 has a difference in the structure of one surface on which the anode 12 is disposed and the other surface on which the cathode 13 is disposed. In addition, there is a difference in the amount and flow of the generated water generated in the anode 12 and the cathode 13.

Accordingly, the discharge flow fields 130, 140 formed on both surfaces of the elastomeric frame 100 is classified into an anode-side discharge flow field 130 formed on one surface, on which the anode 12 is disposed, of both surfaces of the elastomeric frame 100, and a cathode-side discharge flow field 140 formed on the other surface, on which the cathode 13 is disposed, of both surfaces of the elastomeric frame 100. In addition, the anode-side discharge flow field 130 and the cathode-side discharge flow field 140 may be preferably formed in structures different from each other.

However, since the generated water is heavily influenced by gravity, the discharge flow fields 130, 140, that is, the anode-side discharge flow field 130 and the cathode-side discharge flow field 140, formed on both surfaces of the elastomeric frame 100 are formed at positions corresponding to each other on both surfaces of the elastomeric frame 100, respectively. Preferably, when the elastomeric frame 100 is installed to constitute a unit cell for a fuel cell, it is good to form the discharge flow fields 130, 140 at the widthwise edges in the lower direction with respect to the gravity direction.

Hereinafter, both surfaces of the elastomeric frame 100 will be described separately.

First, one surface, on which the anode 12 is disposed, of both surfaces of the elastomeric frame 100 will be described.

As shown in FIG. 2A, one surface of the elastomeric frame 100 is formed with the anode-side first diffusion part 102a through which the reaction gas inflows and outflows while being diffused between the first manifold through hole 110 and the insert through hole 101, and the anode-side second diffusion part 103a through which the reaction gas inflows and outflows while being diffused between the insert through hole 101 and the second manifold through hole 120, respectively.

Accordingly, the anode-side discharge flow field 130 is formed to connect the anode-side first diffusion part 102a with the anode-side second diffusion part 103a.

At this time, the anode-side discharge flow field 130 is classified into a main discharge flow field 131 for directly communicating the anode-side first diffusion part 102a and the anode-side second diffusion part 103a, and a branch discharge flow field 132 spaced at a predetermined interval apart from the main discharge flow field 131 along the longitudinal direction and branched to the insert through hole 101.

Meanwhile, the branch discharge flow field 132 is a flow field serving to allow the generated water generated in the anode-side reaction region 101a to be easily exited to the main discharge flow field 131. To this end, the branch discharge flow field 132 is preferably formed to communicate with the insert through hole 101 in which the insert is disposed.

In addition, as may be seen in FIG. 2A, the main discharge flow field 131 is preferably formed in the form of a diffuser in which the outlet-side end portion to which the reaction gas is discharged is gradually wider in width with respect to the flow direction of the reaction gas. Accordingly, it is possible to improve discharge efficiency of the generated water.

In addition, although not shown in the drawings, the main discharge flow field 131 may be formed in the form which is gradually deeper in depth toward an outlet side to which the reaction gas is discharged with respect to the flow direction of the reaction gas. Accordingly, it is possible to further improve the discharge efficiency of the generated water.

Next, the other surface, on which the cathode 13 is disposed, of both surfaces of the elastomeric frame 100 will be described.

As shown in FIG. 2B, the other surface of the elastomeric frame 100 is formed with the cathode-side first diffusion part 102b through which the reaction gas inflows and outflows while being diffused between the first manifold through hole 110 and the insert through hole 101, and the cathode-side second diffusion part 103b through which the reaction gas inflows and outflows while being diffused between the insert through hole 101 and the second manifold through hole 120, respectively.

Accordingly, the cathode-side discharge flow field 140 is a flow field serving to allow the generated water generated in the cathode-side reaction region 101b to be easily exited to the outside, and is formed to connect the cathode-side first diffusion part 102b with the cathode-side second diffusion part 103b.

However, the cathode-side discharge flow field 140 is formed to directly contact a cathode-side gas diffusion layer 20b. Accordingly, the generated water generated in the cathode 13 flows into the cathode-side gas diffusion layer 20b and then directly flows into the cathode-side discharge flow field 140 to be smoothly discharged.

In addition, as may be seen in FIG. 2B, the cathode-side discharge flow field 140 is preferably formed in the form of a diffuser in which the outlet-side end portion to which the reaction gas is discharged is gradually wider in width with respect to the flow direction of the reaction gas. Accordingly, it is possible to improve discharge efficiency of the generated water.

In addition, although not shown in the drawings, the cathode-side discharge flow field 140 may be formed in the form which is gradually deeper in depth toward an outlet side to which the reaction gas is discharged with respect to the flow direction of the reaction gas. Accordingly, it is possible to further improve discharge efficiency of the generated water.

Next, a shape in which the generated water flows in the elastomeric frame will be described with reference to the drawings.

Figure 4A:
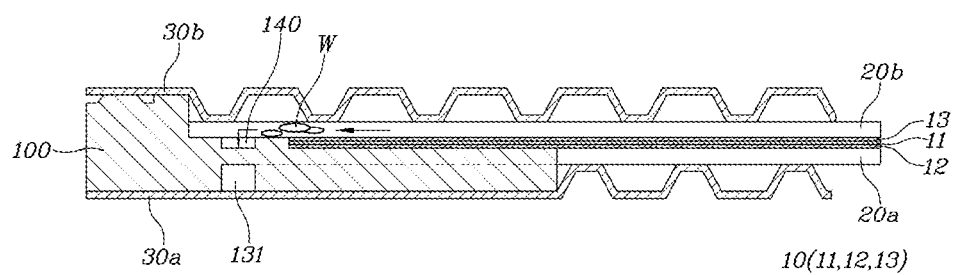
FIG. 4A is a diagram showing the shape in which generated water flows in the elastomeric frame according to an embodiment of the present disclosure.
Figure 4B:
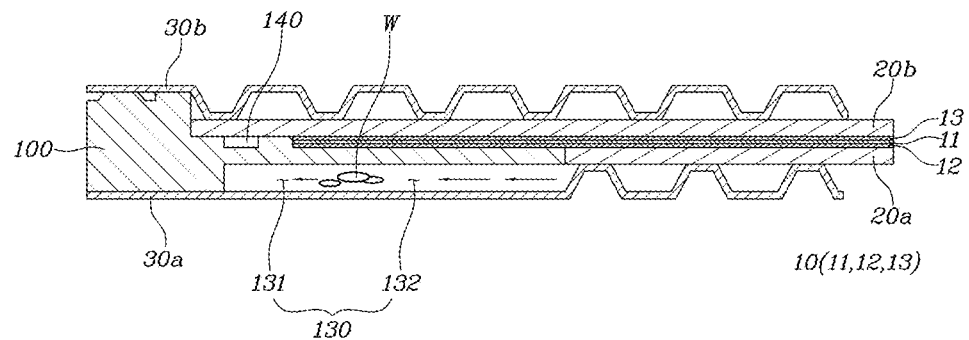
FIG. 4B is another diagram showing the shape in which generated water flows in the elastomeric frame according to an embodiment of the present disclosure.

FIGS. 4A and 4B are diagrams showing a shape in which the generated water flows in the elastomeric frame according to an embodiment of the present disclosure.

First, as shown in FIG. 4A, the generated water generated at the cathode 13 is formed to directly contact the cathode-side gas diffusion layer 20b. Accordingly, the generated water generated at the cathode 13 flows into the cathode-side gas diffusion layer 20b and then directly flows into the cathode-side discharge flow field 140 to be smoothly discharged.

At this time, since the end portion of a cathode-side separating plate 30b is disposed in the form of being mounted to the rim of the elastomeric frame 100, the end region stress of the cathode-side separating plate 30b may be absorbed by the elastomeric frame 100, thereby preventing the polymer electrolyte membrane 11 from being damaged.

Next, as shown in FIG. 4B, the generated water generated at the anode 12 flows into the main discharge flow field 131 through the branch discharge flow field 132 and then the generated water is moved toward the outlet by the differential pressure between both ends of the main discharge flow field 131.

While the present disclosure has been described with reference to the accompanying drawings and the above-described preferred embodiment, the present disclosure is not limited thereto, and is limited by the claims to be described later. Accordingly, those skilled in the art may variously change and modify the present disclosure without departing from the technical spirit of the claims to be described later.

What is claimed is:

1. A cell frame for a unit of a fuel cell, comprising:
an insert comprising a membrane electrode assembly having an anode formed on one surface of a polymer electrolyte membrane, and having a cathode formed on the other surface thereof, and a pair of gas diffusion layers disposed on both surfaces thereof; and
an elastomeric frame disposed to surround a rim of the insert in an outer region of the insert, wherein the elastomeric frame is provided in the form of a sheet that is thermally bonded at the rim of the insert and at an interface between the insert and the elastomeric frame to thereby form a discharge flow field for discharging generated water generated in the insert along a longitudinal direction at a widthwise edge of the elastomeric frame.

2. The cell frame for the fuel cell according to claim 1,
wherein a central region of the elastomeric frame is formed with a through hole in which the rim of the insert is seated and disposed, one side in the longitudinal direction with respect to the through hole is formed with a plurality of first manifold through holes through which reaction gas and coolant inflow and outflow, and the other side in the longitudinal direction is formed with a plurality of second manifold through holes through which the reaction gas and the coolant inflow and outflow,
wherein both surfaces of the elastomeric frame are formed with a first diffusion part through which the reaction gas inflows and outflows while being diffused between the first manifold through hole and the through hole, and a second diffusion part through which the reaction gas inflows and outflows while being diffused between the through hole and the second manifold through hole, respectively, and
wherein the discharge flow field is formed to be distinguished from the through hole such that the discharge flow field is configured to directly communicate the first diffusion part with the second diffusion part.

3. The cell frame for the fuel cell according to claim 2,
wherein the discharge flow field is formed at positions corresponding to each other on both surfaces of the elastomeric frame, respectively.

4. The cell frame for the fuel cell according to claim 3,
wherein the discharge flow field is classified into an anode-side discharge flow field formed on one surface, on which an anode is disposed, of both surfaces of the elastomeric frame, and a cathode-side discharge flow field formed on the other surface, on which a cathode is disposed, of both surfaces of the elastomeric frame, and wherein the anode-side discharge flow field and the cathode-side discharge flow field are structures different from each other.

5. The cell frame for the fuel cell according to claim 4,
wherein the anode-side discharge flow field is classified into a main discharge flow field for directly communicating an anode-side first diffusion part and an anode-side second diffusion part formed on one surface, on which the anode is disposed, of both surfaces of the elastomeric frame and a branch discharge flow field spaced at a predetermined interval apart from the main discharge flow field along the longitudinal direction and branched to the through hole.

6. The cell frame for the fuel cell according to claim 5,
wherein the main discharge flow field and the branch discharge flow field do not directly contact an anode-side gas diffusion layer, which contacts the anode, of the pair of gas diffusion layers.

7. The cell frame for the fuel cell according to claim 5,
wherein the main discharge flow field is formed in the form of a diffuser in which an outlet-side end portion to which the reaction gas is discharged is gradually wider in width with respect to the flow direction of the reaction gas.

8. The cell frame for the fuel cell according to claim 5,
wherein the main discharge flow field is formed in the form which is gradually deeper in depth toward an outlet side to which the reaction gas is discharged with respect to the flow direction of the reaction gas.

9. The cell frame for the fuel cell according to claim 4,
wherein the cathode-side discharge flow field is formed to directly communicate a cathode-side first diffusion part and a cathode-side second diffusion part formed on the other surface, on which the cathode is disposed, of both surfaces of the elastomeric frame.

10. The cell frame for the fuel cell according to claim 9,
wherein the cathode-side discharge flow field directly contacts a cathode-side gas diffusion layer, which contacts the cathode, of the pair of gas diffusion layers.

11. The cell frame for the fuel cell according to claim 9,
wherein the cathode-side discharge flow field is formed in the form of a diffuser in which an outlet-side end portion to which the reaction gas is discharged is gradually wider in width with respect to a flow direction of the reaction gas.

12. The cell frame for the fuel cell according to claim 9,
wherein the cathode-side discharge flow field is formed in the form which is gradually deeper in depth toward an outlet side to which the reaction gas is discharged with respect to a flow direction of the reaction gas.

* * * * *